Figure 1:
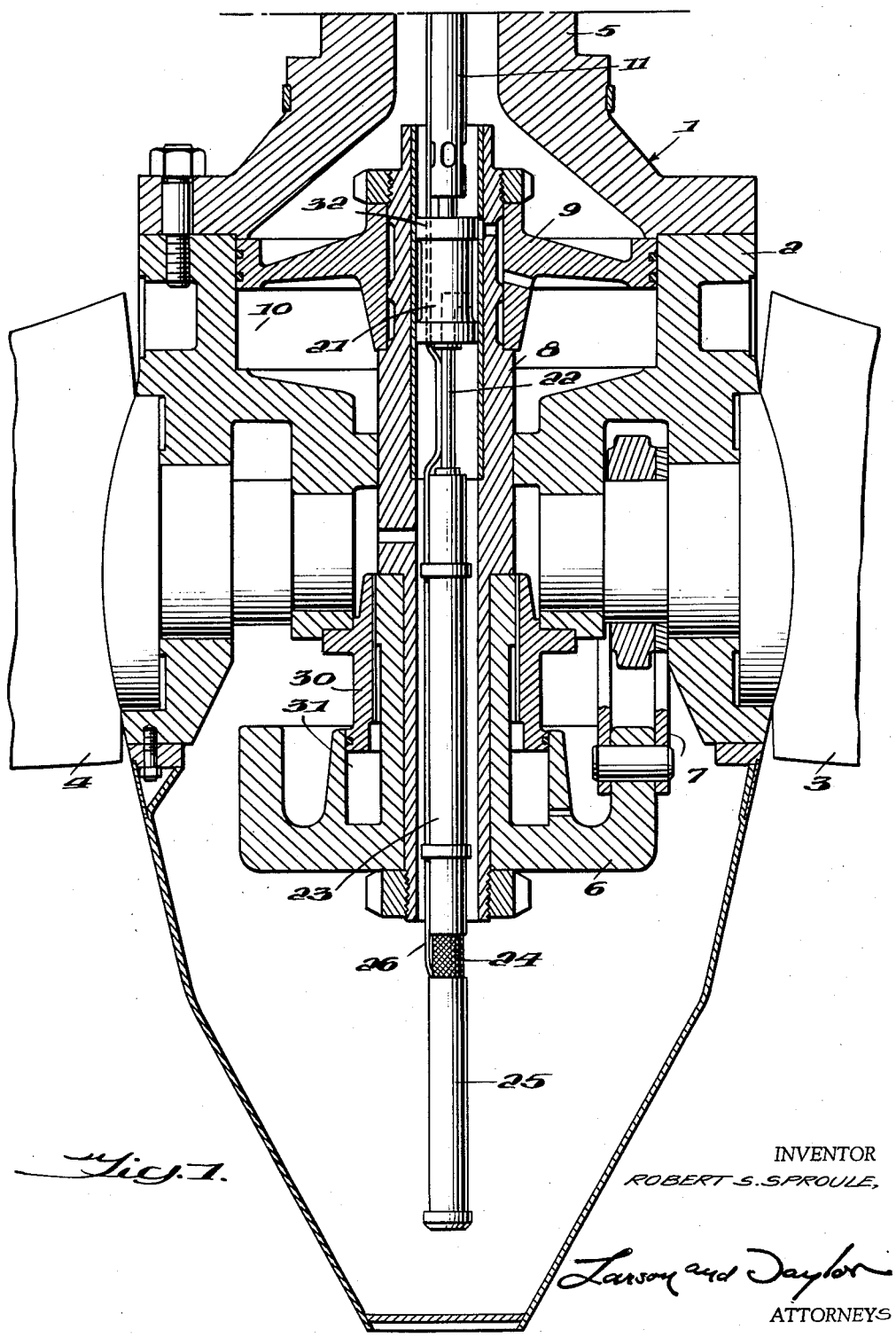

Sept. 1, 1964     R. S. SPROULE     3,146,990
KAPLAN TURBINE (SINGLE-ACTING PIPELESS RUNNER BLADE SERVO)
Filed May 12, 1961     3 Sheets-Sheet 1

INVENTOR
ROBERT S. SPROULE,

Larson and Taylor
ATTORNEYS

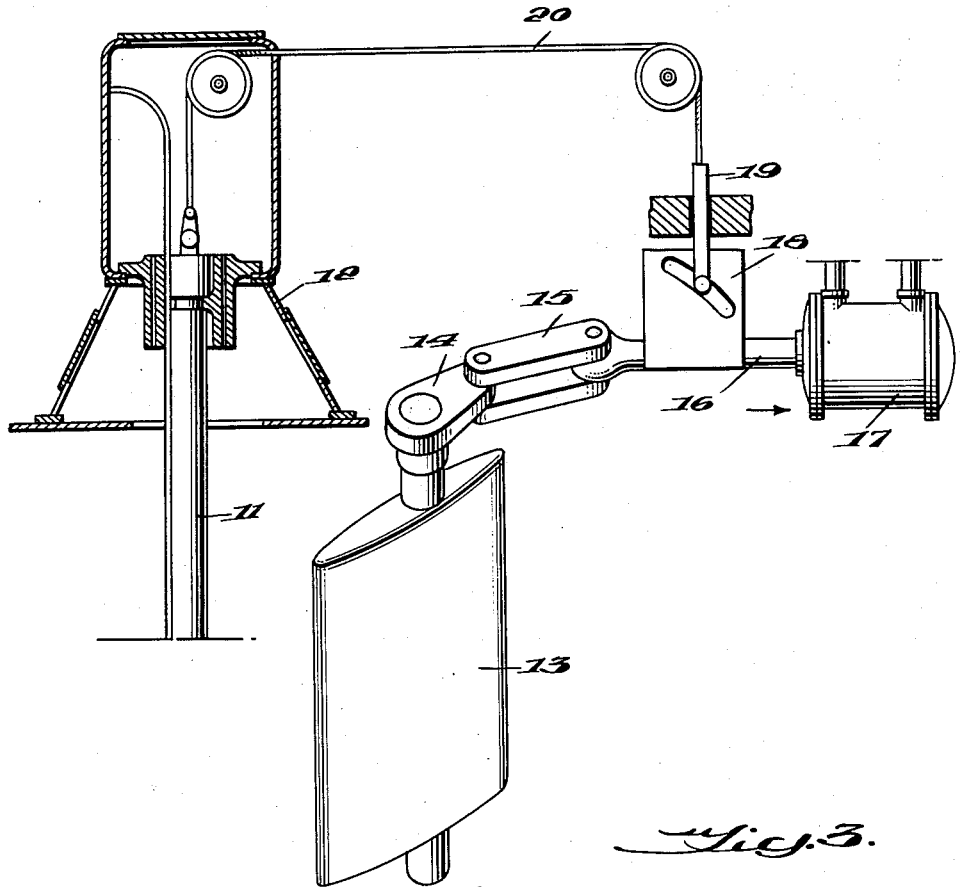
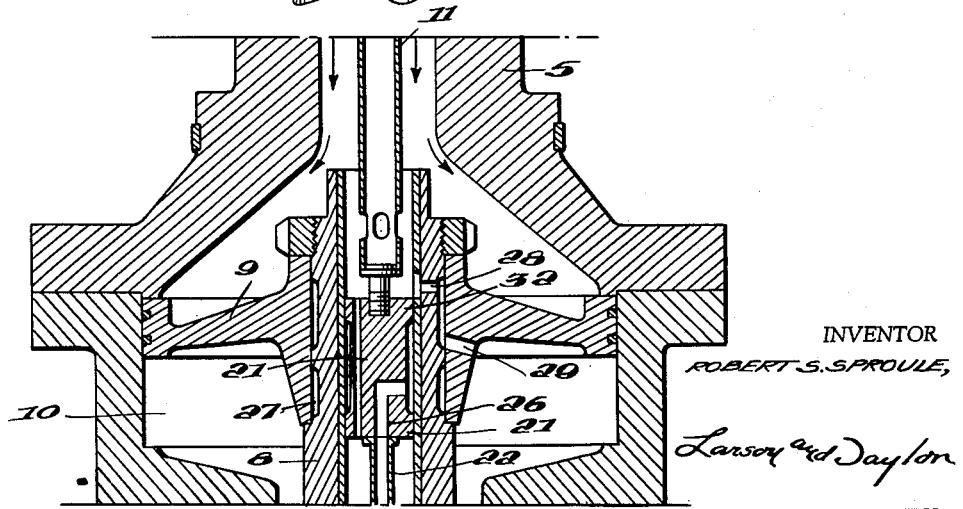

United States Patent Office 3,146,990
Patented Sept. 1, 1964

3,146,990
KAPLAN TURBINE (SINGLE-ACTING PIPELESS RUNNER BLADE SERVO)
Robert S. Sproule, Montreal, Quebec, Canada, assignor to Dominion Engineering Works Limited, Montreal, Quebec, Canada
Filed May 12, 1961, Ser. No. 109,717
2 Claims. (Cl. 253—31)

This invention relates to hydraulic turbines and pumps and more particularly to a runner blade servo system for Kaplan type turbines wherein the runner blades may be rapidly moved to an open position.

In copending application Serial No. 108,814, filed May 9, 1961, there is disclosed a conventional Kaplan type turbine runner blade servo system together with an improved system wherein the actuating mechanism for shifting the angular position of the runner blades is housed within the rotating assembly. The advantages of such an improved system in eliminating the piping and rotary seals of conventional Kaplan turbines are adequately brought out in the aforementioned patent application. There is, however, a disadvantage in such an improved system which the present invention overcomes.

The power demands of a generator may vary instantaneously and it is, of course, desirable that the turbine accept the change in load requirements rapidly. A comparatively large fast acting servo mechanism may be utilized to control the wicket gate movements. However, space requirements limit the size of the servo motor which may be utilized to control the runner blade movements when the actuating mechanism is housed within the rotating assembly as disclosed in patent application Serial No. 108,814. When a decreased power requirement arises, the rapidly moving wicket gates may provide the prompt response necessary to properly adjust the turbine to this decreased power requirement and the slower response of the runner blades to a more closed position is not of consequence. However, an increased load may be met by the turbine only by the proper adjustment of both the wicket gates and runner blades to the more open position and hence the slower moving runner blades determine the time within which the turbine adjusts to the increased load.

The present invention overcomes the foregoing disadvantage by utilizing the hydrodynamic force acting against the runner blades and tending to move the blades to an open position. Means is provided whereby upon an increased power demand this force will rapidly move the runner blades to the desired more open setting in accordance with the wicket gate setting.

According to the present invention the rotating assembly of the turbine includes a casing with the runner blades rotatably journalled therein, the rotating assembly including a servo motor operatively connected to the runner blades, a pump and means for driving the pump. The casing itself may constitute the reservoir for the pump. In these respects the structure is similar to the structure disclosed in my copending application hereinbefore referred to. However, according to the present invention the servo motor and control valve means is adapted to drive the runner blades towards a closed position only. One end of the piston and cylinder assembly comprising the servo motor is vented to atmosphere and, when the control valve is moved to connect the other end of the assembly to the reservoir, the hydrodynamic forces acting against the runner blades moves the blades to a more open position. In this manner a very rapid response to an increased power requirement is achieved without increasing the size of the runner blade servo system or sacrificing the advantages gained by disposing the system within the rotating assembly.

A primary object of the present invention is to provide in a runner blade servo system disposed within the rotating assembly of a turbine means for achieving a rapid response to increased power requirements.

Another object of the present invention is to provide in a runner blade servo system disposed within the rotating assembly of a turbine a single acting servo motor for driving the runner blades towards a closed position and means for utilizing the hydrodynamic forces acting against the runner blades to rotate the blades to a more open position.

Figure 4:
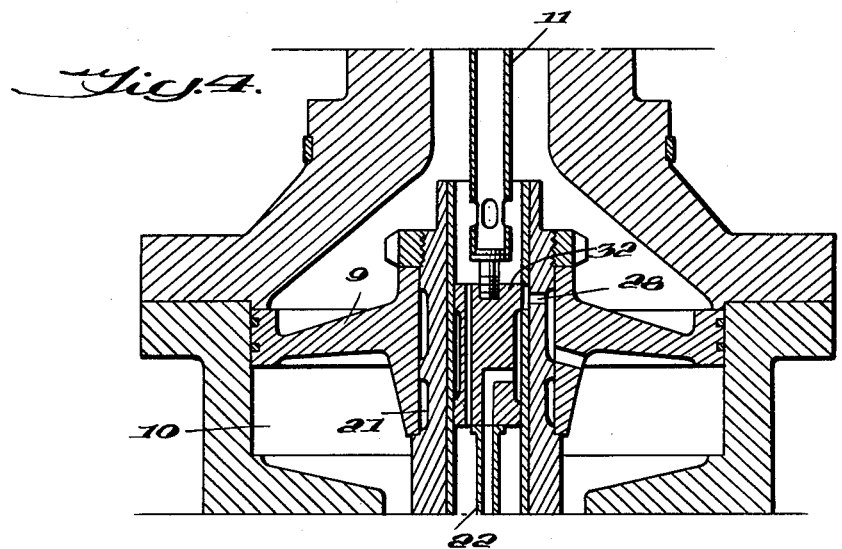
Figure 5:
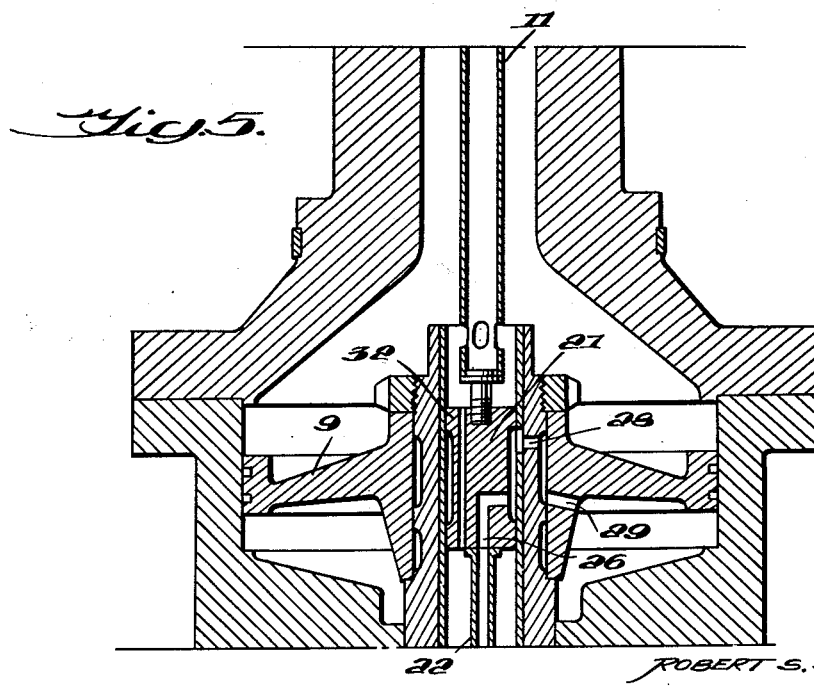

Other objects and many of the attendant advantages of the present invention will become more readily apparent upon consideration of the following detailed specification in connection with the accompanying drawings wherein:

FIG. 1 is an elevational view partly in section of a portion of the runner blade control system according to the present invention, FIG. 2 is a view partly in section of another portion of the runner blade control system, FIG. 3 is a sectional view showing the control valve in position to shift the blade actuating piston downwards to open the blades, FIG. 4 is a sectional view showing the control valve and piston in equilibrium, and FIG. 5 is a sectional view showing the control valve in position to shift the blade actuating piston upwards to close the blades.

Referring now more specifically to the drawings wherein like numerals indicate like parts throughout the several views there is shown at 1 in FIG. 1 a rotatable casing structure including a hub 2, the hub providing means to rotatably journal runner blades 3 and 4. A hollow shaft 5 extends from the rotatable casing and this shaft drives the rotor of a generator (not shown). The runner blades are driven by water fed thereto through a casing (not shown) surrounding the runner blades. A plurality of wicket gates are mounted within this casing and the angular position of these wicket gates is set in accordance with the power demand on the turbine. It has been found that the turbine runs more smoothly and efficiently when the runner blades are set at a specific angular position for each angular position setting of the wicket gates.

The runner blades are rotatably journalled in the hub of the rotatable casing structure and are connected with a crosshead 6 by means of links such as shown at 7 interconnecting runner blade 3 with the crosshead 6. The linkage interconnecting the runner blade 4 with crosshead 6 is not shown for the sake of clarity but it will be understood that each of these runner blades is operatively connected with the crosshead 6 in such a manner that movement of the crosshead along the longitudinal axis of the casing structure 1 will cause simultaneous angular movement of the runner blades.

The crosshead 6 is connected with a piston rod 8 which has the upper end thereof fixed to piston 9 slidable within a cylinder 10. It can be readily appreciated that the piston and crosshead are interconnected so that movement of the piston will produce corresponding movement of the crosshead and hence vary the angular position setting of the runner blades. The piston 9 and cylinder 10 comprise a servo motor controlled by a valve mechanism and rod 11 which extends upwardly through the generator (not shown) to a fixed casing 12, FIG. 2.

In FIG. 2 there is shown a wicket gate 13 which is connected by links 14 and 15 with the piston rod of a servo motor 17. The piston rod 16 has mounted thereon a cam 18 and this cam is provided with a cam follower 19 conected with control cable 20 which is secured to the upper end of control rod 11. A suitable power source supplying hydraulic fluid to either end of servo motor 17 drives the piston rod 16 in either direction to determine the angular setting of wicket gate 13. Through the cam and cam follower the control rod 11 will position the valve means so that the runner blades will be shifted to a predetermined position corresponding to the setting of the wicket gates and will appear more clearly hereinafter.

The lower end of the control rod 11 has a spool shaped valve body 21 mounted thereon and a hydraulic pressure pipe 22 interconnects the spool valve with a pump 23. The pump 23 has an inlet 24 as shown and is driven by a motor 25 having current supplied thereto by electric cable 26.

The spool valve 21 is shown in section in FIG. 3 and it can be seen that the hydraulic pressure pipe 22 communicates with duct 26 within the spool valve. The valve body is provided with a return passageway 27. A port 28 is provided in the piston rod 8 and a duct 29 connects port 28 with one side of the piston 9. The other side of the piston 9 and the upper end of the cylinder 10 may be vented to atmosphere through the hollow shaft 5. The entire casing 1 may constitute a reservoir for the pump 23.

The operation of the presently disclosed system will now be described. In FIG. 4 the parts are shown in an equilibrium position. The control rod 11 positions the spool valve 21 so that the land 32 covers the port 28. Thus, the hydraulic fluid positioned within the cylinder 10 beneath the piston rod 9 is completely closed off.

When there is an increased power demand on the turbine the wicket gates such as shown at 13 in FIG. 2 are moved to a more open position. Because of the size of the servo motor 17 actuating the wicket gates a relatively fast movement of the gates can be achieved. It can be seen that opening movement of the wicket gates 13 will cause lowering of the control rod 11 so that the land on the valve spool 21 will be uncovered thereby permitting hydraulic fluid to pass from beneath the piston 9 through duct 29, port 28 and return passageway 27. There is a hydrodynamic force which acts against the runner blades and tends to turn the runner blades on their pivotal axis to move the blades to the open position. When the wicket gates are moved towards an open position so as to shift the valve spool to the FIG. 3 position, the runner blades are free to move due to the hydrodynamic force acting thereagainst and the movement of the blades will move the piston 9 downwardly as viewed in FIG. 3 so as to force hydraulic fluid through duct 29, port 28 and return passageway 27 to the reservoir. The upper end of the cylinder 10 is open to the atmosphere so that as the piston moves downwardly air may enter the upper end of the cylinder as shown by the arrows in FIG. 3.

When the wicket gates are moved to a more closed position the control rod 11 is shifted upwardly as shown in FIG. 5 so that the land 32 on valve spool 21 uncovers port 28 and interconnects ducts 29 and 26. In this position of the valve 21 hydraulic fluid will be pumped through hydraulic pressure pipe 22, duct 26, port 28, and duct 29 to the lower side of piston 9. The piston 9 will move upwardly as viewed in FIG. 5 to shift the runner blades towards a closed position. It can be readily seen that the piston will move upwardly until the port 28 is completely covered by the land 32 on valve spool 21 whereupon a condition of equilibrium will again exist.

Referring to FIG. 1 there can be seen a dashpot comprising piston 30 and cylinder 31 to restrict the rate of movement of the blades in the closing direction should abnormal torque conditions arise.

It can be seen that according to the present invention there is provided a servo mechanism for controlling the runner blades wherein the mechanism is completely housed within the rotatable assembly and wherein means is provided to permit the runner blades to open in response to the hydrodynamic forces acting against the blades. This permits a rapid response of the turbine to varying power requirements. Obviously, many modifications and variations of the present invention are possible in light of the above teachings. What is claimed as new and desired to be secured by Letters Patent is:

1. In a Kaplan type turbine having runner blades which tend to move to open position in response to hydrodynamic forces thereon and including adjustable wicket gates and wicket gate operating mechanism for changing the setting of the wicket gates to control the flow of water to turbine runner blades, a rotating assembly including a rotatable shaft, a casing rigidly secured to said shaft, a liquid reservoir disposed within said casing, runner blades journalled in said casing for rotation about axes radial to the casing, and means for shifting the position of said runner blades in response to change in the position of said wicket gates, said means being disposed in said casing and comprising a pump and hydraulic servo motor means including a piston and cylinder assembly, means conecting said piston with said runner blades, control valve means for connecting one side only of said piston selectively with the reservoir and the output of said pump, the other side of said piston being vented to atmosphere, said servo motor driving said runner blades to closed position when said control valve means connects the one side of said piston with the output of said pump and hydrodynamic force moving said runner blades to open position when said control valve means connects the one side of said piston with the reservoir.

2. In a turbine according to claim 1 and further including a dashpot for cushioning the movement of the runner blades to closed position.

References Cited in the file of this patent

UNITED STATES PATENTS

| 1,858,566 | Terry | May 17, 1932 |
| 1,950,776 | Biggs | Mar. 13, 1934 |
| 2,310,994 | Ring et al. | Feb. 16, 1943 |
| 2,518,925 | Nussbaum | Aug. 15, 1950 |

FOREIGN PATENTS

| 193,324 | Austria | Nov. 25, 1957 |
| 703,319 | Germany | Mar. 6, 1941 |
| 757,575 | Great Britain | Sept. 19, 1956 |